US006551226B1

(12) United States Patent
Webber et al.

(10) Patent No.: US 6,551,226 B1
(45) Date of Patent: *Apr. 22, 2003

(54) ADJUSTMENT APPARATUS FOR EXERCISE MACHINE

(75) Inventors: Randall T. Webber, San Diego, CA (US); Bruce Hockridge, San Diego, CA (US)

(73) Assignee: Hoist Fitness Systems, San Diego, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 09/672,939

(22) Filed: Sep. 28, 2000

(51) Int. Cl.[7] .................. A63B 26/00; F16B 7/10
(52) U.S. Cl. ............. 482/148; 482/908; 403/109.3; 403/109.6
(58) Field of Search .................. 482/23, 32, 33, 482/17, 42, 103, 106, 109, 138, 142, 148, 908; 403/109.1, 109.2, 109.3, 109.6, 109.7, 109.8, 108, 330, 104; 473/323; 135/142

(56) References Cited

U.S. PATENT DOCUMENTS

| 1,303,416 | A | | 5/1919 | Tidyman |
| 1,443,835 | A | * | 1/1923 | Buikema .................... 403/108 |
| 1,750,549 | A | * | 3/1930 | Thomson et al. ............. 482/72 |
| 1,994,980 | A | * | 3/1935 | Cook ........................ 403/108 |
| 2,855,200 | A | * | 10/1958 | Blickman ................... 482/130 |
| D191,349 | S | | 10/1961 | Spencer |
| 3,285,070 | A | * | 11/1966 | McDonough .............. 482/138 |
| 3,438,627 | A | * | 4/1969 | LaLanne .................... 482/103 |
| 3,499,674 | A | | 3/1970 | Voran et al. |
| D218,279 | S | | 8/1970 | Chaumont |
| 3,606,423 | A | | 9/1971 | McCarthy |
| 3,614,097 | A | * | 10/1971 | Blickman .................... 482/72 |
| 3,704,850 | A | | 12/1972 | Hendrickson et al. |
| 3,780,974 | A | | 12/1973 | Takahashi |

(List continued on next page.)

FOREIGN PATENT DOCUMENTS

GB 2186806 * 8/1987 ............. 482/103

OTHER PUBLICATIONS

HR1 Recumbent Exercise Bike, Hoist Fitness Brochure, 1994.
Hammer Strength Seated Bicep Machine, Hammer Brochure, 1993.
Hammer Brochure, 1993.
Nautilus Brochure, 1980's.
Nautilus 2ST Nautilus Brochure, 1990.
D100 Bicep Curl, Hoist Fitness Owner's Manual 1996.
Seat Back Adjustment, Hoist Fitness Brochure, 1989.
Twist N' Lift Seat, Hoist Fitness Brochure, 1989.
Brake Handle Adjuster, Nautilus Brochure, 1990's.
Brake Handle Adjuster, Parabody Brochure, Undated.
Ratcheting Seat Adjuster, Hoist Fitness Brochure, 1999.
Hoist Express, Hoist Fitness Brochure, 1980.

Primary Examiner—Glenn E. Richman
Assistant Examiner—Victor Hwang
(74) Attorney, Agent, or Firm—Brown, Martin, Haller & McClain LLP

(57) ABSTRACT

An adjustment apparatus for adjusting the position of a member on an exercise machine has an inner tube with a series of spaced pinning holes and an outer tube telescopically engaged over the inner tube and having a locator hole for alignment with a selected pinning hole. A lever has a pinning section pivotally mounted on the outer tube to extend across the locator hole, and a hand engaging section extending at an angle to the pinning section. The pinning section is pivotable between an operative position in which a pinning button projects through the locator hole and an aligned pinning hole in the inner tube to secure the tubes together, and a retracted position in which the pinning button is spaced from the locator hole. A handle is mounted on the outer tube to extend in the same general direction as the hand-engaging section such that a user gripping the handle can engage the hand-engaging section and urge it towards the handle to pivot the pinning section into the retracted position.

24 Claims, 3 Drawing Sheets

U.S. PATENT DOCUMENTS

| | | |
|---|---|---|
| 4,185,936 A | 1/1980 | Takahashi |
| 4,349,193 A * | 9/1982 | Lambert et al. ............ 482/100 |
| 4,586,399 A | 5/1986 | Kassai |
| 4,596,484 A | 6/1986 | Nakatani |
| 4,695,028 A | 9/1987 | Hunter |
| 4,761,092 A | 8/1988 | Nakatani |
| 4,898,413 A | 2/1990 | Bertolini |
| D306,688 S | 3/1990 | Hyde |
| 4,928,916 A | 5/1990 | Molloy |
| 5,221,064 A * | 6/1993 | Hodges ....................... 248/333 |
| 5,441,470 A | 8/1995 | Chen |
| 5,600,976 A | 2/1997 | Hapke et al. |
| 5,625,923 A | 5/1997 | Huang |
| 5,882,283 A | 3/1999 | Stevens |
| 5,887,490 A | 3/1999 | Dittmar |
| 5,975,593 A | 11/1999 | Cress |
| 6,032,914 A | 3/2000 | Bastida |
| 6,347,777 B1 * | 2/2002 | Webber et al. ........... 248/188.5 |

* cited by examiner

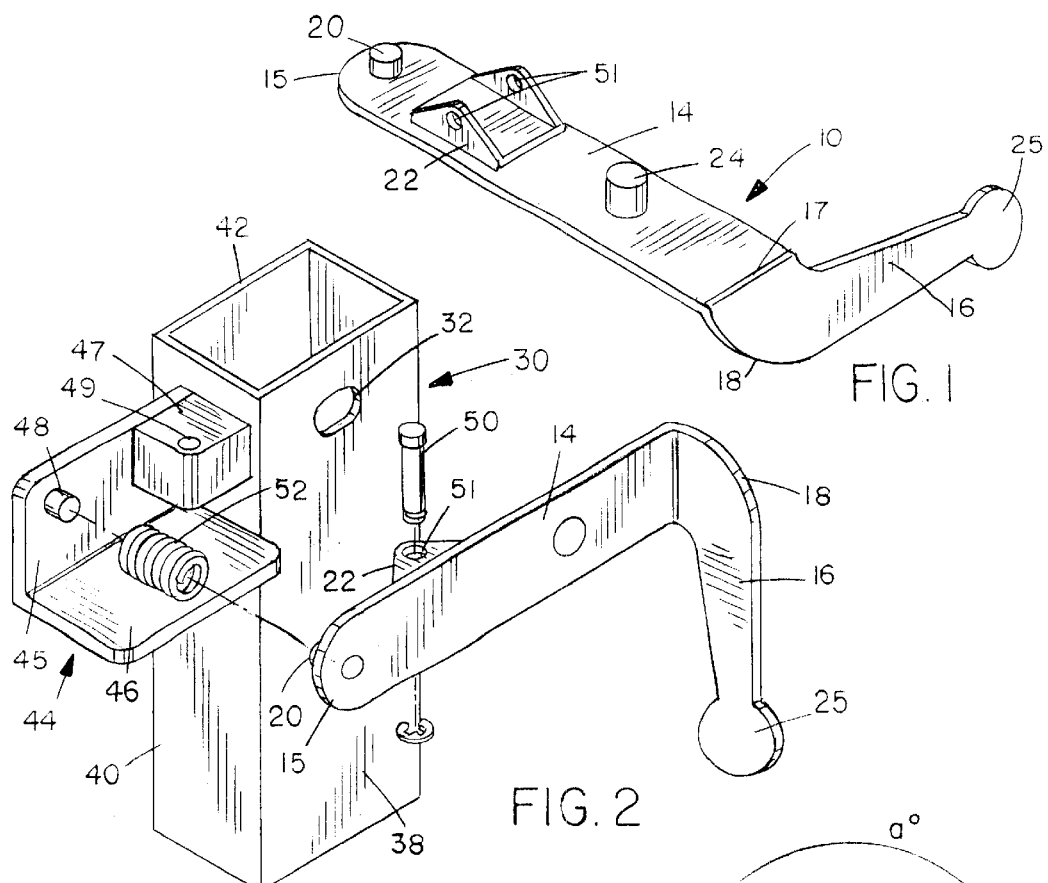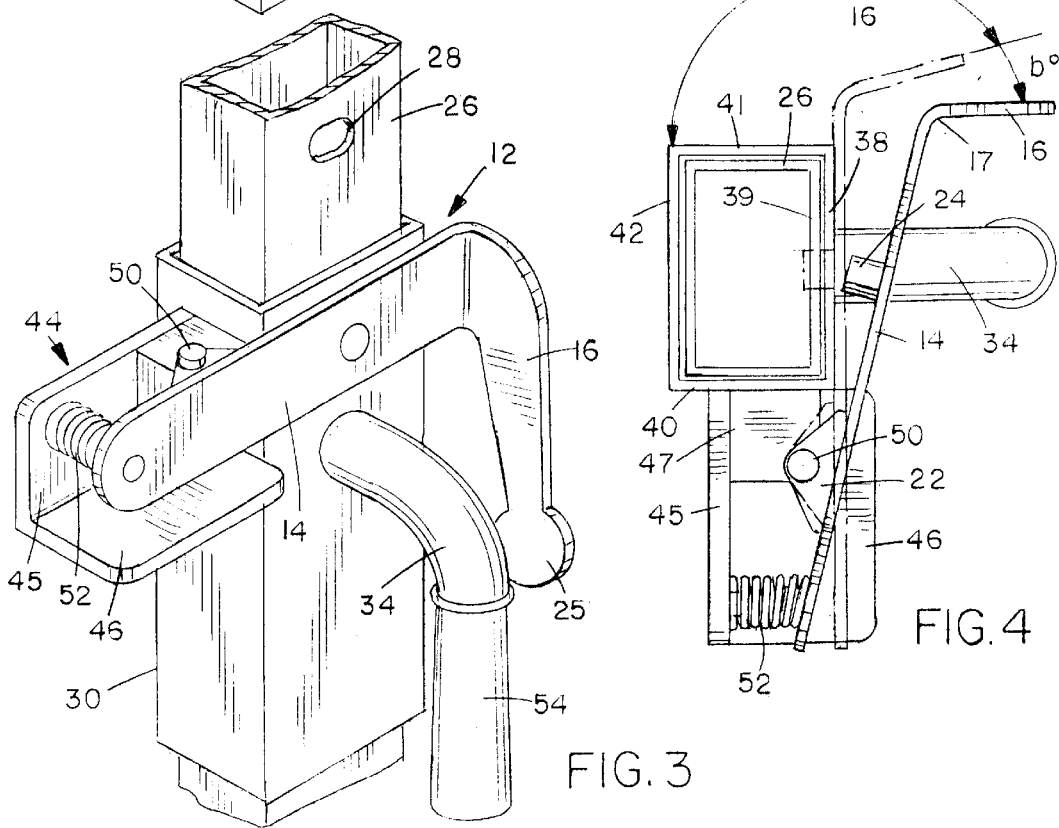

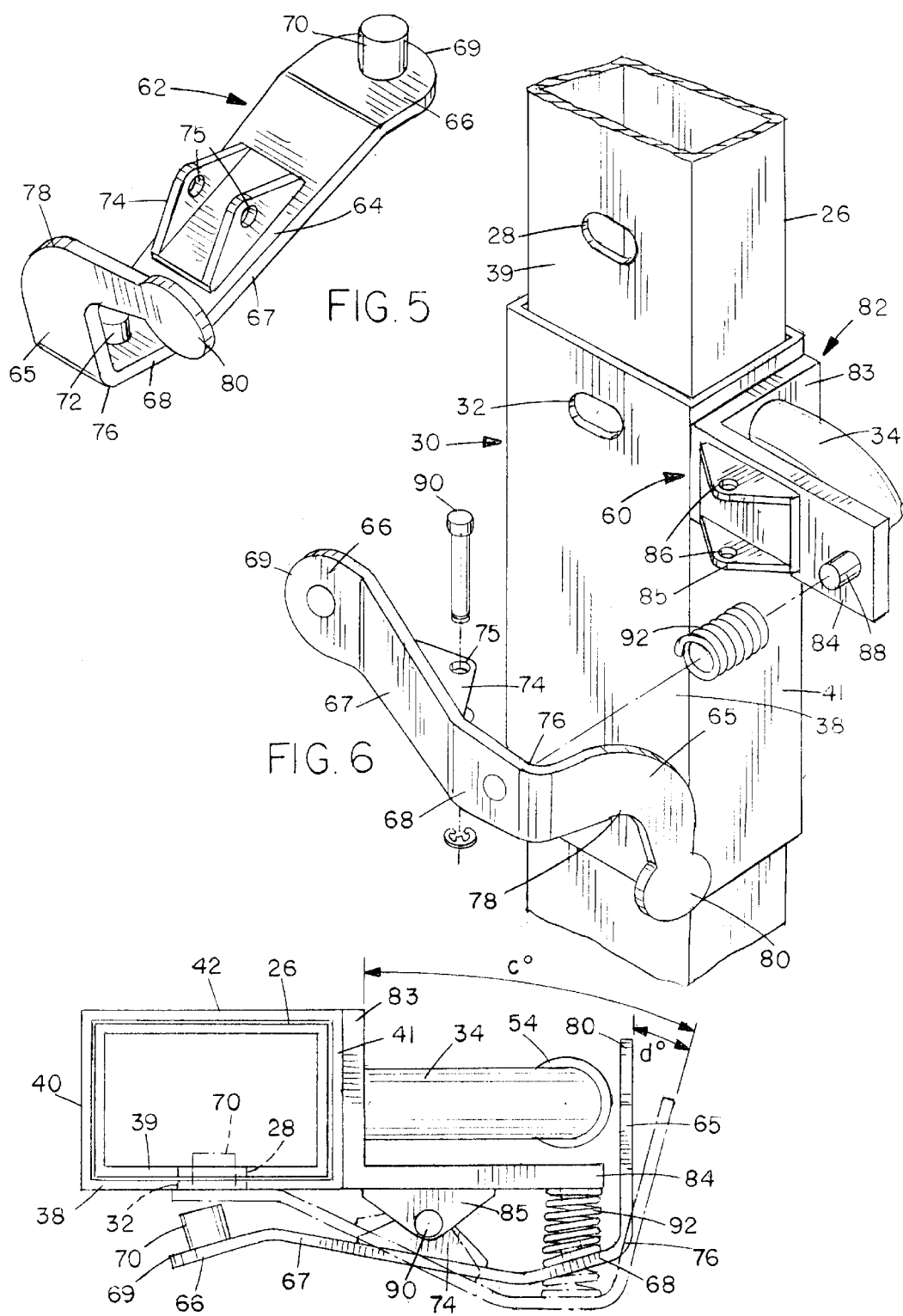

ADJUSTMENT APPARATUS FOR EXERCISE MACHINE

BACKGROUND OF THE INVENTION

The present invention relates generally to adjustment apparatus for adjusting the height or position of parts of an exercise machine, such as load engaging parts including exercise arms or cables, or non-load engaging parts such as seats or back pads.

In order to accommodate users of various shapes and sizes, exercise equipment has traditionally had adjustable components. Seats, back pads, platforms, exercise arms, and cable ends used for attaching various handles or grips are all typically adjustably mounted. This provides the user with the ability to tailor the machine or bench to fit their specific needs. This is particularly useful in a commercial setting such as a health club, because of the many different users having access to the equipment. Convenience, durability and safety are three important factors in the design and implementation of component adjustability.

Adjustable parts or components of exercise machines are normally mounted on one of a pair of telescoping adjustment tubes, with an adjuster on the other tube for engaging the first tube to secure the part in a selected position. There are two major categories of adjuster: stationary and movable. Stationary adjusters are fixed in place and are part of the equipment framework. Movable adjusters are designed to travel with the part that is being adjusted. Within these two categories are two sub-categories: adjusters that directly engage and disengage an adjuster tube (single stage) and those that require a secondary link or connection (two stage). In each of these sub-categories there are adjusters which have fixed incremental settings, and those without fixed settings.

Adjusters without fixed incremental settings provide infinite adjustability anywhere along the adjustment path. They can be quicker and easier to use because the user does not have to locate a fixed position when making the adjustment. There are generally three types of infinite adjusters. The first type of infinite adjuster uses a threaded tension knob to apply pressure to hold the adjusting member in place. The user simply turns the knob to secure or release the adjustable member. Although this type of adjuster is easy to use and inexpensive, it has a number of flaws. First, the threaded end of the adjuster mars the finish on the inner adjusting tube, and severe over-tightening can strip the threads and require replacement. Secondly, if the knob loosens during use, the adjusted part will slip, which may cause injury to the user. Also, in commercial use, it is common for one user to over-tighten the knob, making it difficult for others to loosen it. Finally, adjustment positions cannot be easily documented or repeated. If a user finds an ideal position one day, it will be almost impossible for the user to place the part in exactly the same position on subsequent uses of the equipment. It is important when exercising to know your positioning on each piece of equipment. Full range of motion, amount of pre-stretch, and axis of rotation positioning are all determined by the exercise arm, platform, seat or back pad positioning. If the user is not in the proper position, they will not receive the full benefit from the exercise, and could even risk potential injury.

The threaded tension knob adjuster is a single stage or direct engagement adjuster. Because it relies solely on the amount of tension applied by the user, it can never be used safely on a load engaging adjustable member.

The second type of infinite adjuster uses leverage and the weight of the adjusting part itself to wedge or secure it in place. This is another example of a single stage adjuster, and is a movable type of adjuster. In order to make the adjustment, a user must lift the free end of the adjustable part, thereby releasing its weight and allowing the adjuster to move. One problem with this design is that, once tension is released, gravity and the weight of the part (platform, seat, exercise arm, or the like) can make it hard to control. The user must be paying attention and use both hands or the part could fall. If the front end of an unoccupied seat is accidentally bumped, the seat could drop and damage the equipment or cause injury. This is a safety liability and this type of adjuster should only be used on non-load engaging members. This adjuster also has problems due to lack of position identification and repeatability.

The third type of infinite adjuster is an assisted adjuster. This uses a gas shock to move and hold the adjustable member in place. It is generally used for non-load bearing seat and back pad adjustments because the adjustment length is limited to the displacement or stroke of the gas shock device. It requires the strength of the shock device's internal system to hold the adjuster in place. While it works well for adjustment in one direction, into the extended position of the shock device, it requires force, such as the user's body weight, to push against the assisting device or shock in the opposite direction. Because of this, it is difficult to make adjustments unless the user is in the exercise position. This type of adjuster is relatively expensive to produce and maintain or service. Also, it is a two-stage system which requires use of a cable to connect the adjustment lever to the gas shock, and has the same problem as the other infinite adjusters with position identification and repeatability.

Gas shocks without cable connectors can also be used in conjunction with fixed incremental single stage adjusters such as pull-pins, in order to offset the weight of the part being adjusted. This can permit position identification. However, the problems of adjustment distance and expense of the device still arise in this type of adjuster.

Fixed incremental adjusters, while providing fewer adjustment positions, are more secure and provide the ability for the user to accurately, identify, and repeat, an adjustment position. They utilize a direct pinning system to lock the adjustable member in place. There are generally six types of fixed adjusters.

The first type of fixed adjuster is a straight through pin which extends through a single through hole on an outside tube into one of a series of holes on an inner telescoping tube. A straight pin adjuster of this type is described in U.S. Pat. No. 5,882,283 of Stevens. This adjuster is a single stage adjuster which can be used on both load engaging and non-load engaging members of an exercise machine. The part or component to be adjusted may be secured to either the inner or the outer telescoping tube, with the other tube being fixed to the framework of the machine. This is a simple and effective way to lock the adjustable member in place. Because the adjusted part is secured in a fixed location, its position can easily be identified and repeated. The disadvantage of this design is that the pin can work itself loose and back out. This will cause a seat to drop or an exercise arm to come loose, which can cause serious injury. Another disadvantage is that the pin is easily misplaced, because it is not attached to the equipment, and this renders the equipment inoperable.

The second type of fixed adjuster uses a spring-loaded pull pin to replace the straight pin. Again, this is a single stage adjuster which can be used on both load engaging and non-load engaging adjustable members. In this design, a hole is drilled in one wall of the outer of two telescoping tubes, and the pull pin barrel is welded over the hole. The pull pin is a spring-tensioned plunger with a knob on one end, and is secured in the barrel with the knob protruding from the outer end of the barrel. The inner telescoping tube has a series of incrementally spaced pinning holes. The pull pin is pulled back against the spring, one of the two tubes is adjusted to the desired position, and the pull pin is released to extend through the opening in the outer tube and an aligned opening in the inner tube. The adjusted part is held securely in place, and the spring tension prevents the pin from working loose. The adjusted position is easily identified and repeated. One disadvantage to this adjuster is that the user must use both hands to control the adjustable part and to pull the pull pin at the same time.

Another type of fixed incremental adjuster is called a shifter. This is-a two stage adjuster which combines an adjusting lever and a handle in the same part. The lever has a grip on a first end, a connecting link, and a pivot bracket, one of which will be located on the second end and the other of which is located between the two ends. The lever is pivotally connected to either the frame or the movable part and, depending on the location of the pivot bracket, is either depressed or lifted to engage and disengage the pinning button. Because of the additional length needed for a grip, the lever is too long for the direct engagement of an attached pinning button. Therefore, a connecting link is used to connect the lever to a pull-pin type actuator. This design has several disadvantages. First, it requires more space to use because of its increased length and the added parts make it more expensive to build, service, and maintain. Secondly, because the handle and lever are one and the same, it is impossible to control the movement of the part and engage the pinning button (by releasing the lever) at the same time. While this adjuster can be used on both load engaging and non-load engaging adjustable members, the user must use a second hand or their feet (for leg engaging exercise members) to control the movable part.

The fourth type of fixed incremental adjuster is known as a twist and lift adjustment system. In this system, a round outer telescoping tube has a central channel or slot machined along a part of its length, with a series of downwardly angled slots running off to one side of the channel at spaced intervals. The round inner tube has a pin or bolt protruding outwardly and captured in the channel in the outer tube. This system is designed exclusively for seat and back pad adjustment. The seat or back pad is held in an adjusted position by engagement of the pin in one of the angled slots. In order to adjust the seat or back pad position, the user must twist and lift the pad, which in turn twists and lifts the pin out of the angled slot and back into the straight channel or slot. From this point, the pad or seat can be moved into a new position, with the pin moving along the straight channel. Once the desired position is reached, the pad or seat is twisted back to engage the pin in the appropriate angled slot. This is a quick and simple single stage adjuster that allows adjusted positions to be readily identified and repeated. Because this system can only be used with round tubing, it is costly to machine the channel and slots in the outer tube, and difficult to position the seat or back pad square to the frame. Another disadvantage is the limited number of possible adjustment positions, and the increased distance between these positions compared with other systems. A further disadvantage is that, if an unoccupied seat is bumped sideways, the pin may slide into the straight channel, allowing the seat to fall and potentially causing damage or injury.

The fifth type of fixed adjuster is the ratcheting lever system. This consists of a lever pivotally mounted on the outer telescoping tube and having a first end from which a pinning button projects. The pinning button protrudes through a hole in the outer tube and a selected hole in the inner tube. The lever is pivoted at a point between its first and second ends, and is designed to ratchet or automatically disengage from the inner tube hole when the adjustable member is moved in a first direction, yet instantly pin the inner tube and secure it from movement in a second direction. When the adjustable member is moved in the first direction, the first edge of an inner tube pinning hole engages the first end of the lever, forcing it to pivot outward and allowing the tube to adjust. The lever is weighted or biased so as to always remain in contact with the inner tube. This allows the first lever end or pinning button to briefly engage each pinning hole as it passes and instantly seat into an aligned pinning hole when the movement is stopped. Because the lever is designed to pivot in one direction only, movement in a second direction wedges the second edge of an inner tube pinning hole against the first or protruding end of the lever, securing the adjustable member in place. In order to adjust from a locked position, the lever must be pivoted by depressing its second end, disengaging the first end from the inner tube pinning hole and permitting relative movement between the inner and outer tubes.

While the ratcheting lever system has the ease and convenience of assisted adjusters, and can be adjusted with one hand in one direction, like the twist and lift system, the ratcheting feature only works when the lever is placed parallel to, and in line with, the inner tube pinning holes. This single stage adjuster is particularly suitable for seat and back pad adjustment, and it can be easily activated by the physically challenged individual, without using fingers. However, because of the ratcheting feature, it can only be used on unidirectional exercise arms and cable ends with unidirectional pull.

The sixth type of fixed increment adjuster uses a bicycle brake handle as the adjuster lever. It is a two stage adjuster that is used in conjunction with a handle and requires a cable to link the lever to the pull-pin actuator. The user places the handle in the web of their hand, between the thumb and index finger, and squeezes the lever using their fingers in order to disengage the pinning button. The user must release the brake handle lever in order to re-engage the pinning button. This design has several disadvantages. The web on the user's hand cannot provide enough control for a moving part, especially one that must be lifted overhead such as an overhead pulley cable end. Once the fingers are released, the user is counting on the strength of the pull-pin spring and the speed at which it propels the pinning button to keep the adjusted part from falling. A second hand or the user's feet should be used for control. Because it requires a cable link between the handle and the actuator, it is best suited for traveling with the part being adjusted. This increases the cost to both produce and maintain this part.

Thus, all existing adjuster devices for adjustable position exercise machine components are subject to various disadvantages. Infinite adjusters are sometimes not sufficiently secure for safety purposes, and do not allow user's to accurately identify and reproduce a desired part position. Fixed incremental adjusters are sometimes difficult to use, and some such adjusters can be more expensive to manufacture and maintain. Some fixed incremental adjusters, such as the straight through pin and twist and lift adjuster, are also subject to accidental release, causing potential damage to the machine as well as possible injuries to people in the vicinity.

SUMMARY OF THE INVENTION

It is an object of the present invention to provide a new and improved adjustment apparatus for adjusting the position of both load-engaging and non-load engaging members on an exercise machine.

An adjustment apparatus for adjusting the position of a member on an exercise machine according one aspect of the present invention comprises an inner tube having a series of spaced, in line, pinning holes, an outer tube telescopically engaged over the inner tube and having a first side wall with a locator hole for alignment with a selected pinning hole, a pivot mount on the outer tube, a lever having first and second ends, a first, pinning section extending from the first end along part of the lever and a second, hand engaging section extending from the pinning section to the second end at an angle to the pinning section, the pinning section being pivotally mounted on the pivot mount to extend in a first direction across the locator hole, having a pinning button projecting towards the locator hole, and being pivotable between an operative position in which the pinning button projects through the locator hole and an aligned pinning hole in the inner tube to secure the tubes together, and a retracted position in which the pinning button is spaced away from the locator hole, a biasing device on the outer tube biasing the lever towards the operative position, and the hand engaging section projecting at an obtuse angle to the pinning section, whereby pressing of the hand engaging section in a second direction by a user moves said pinning button from the operative position to the released position.

In an exemplary embodiment, the pinning section extends across the first side wall in a direction transverse to the longitudinal axes of the telescopically engaged tubes, and the hand engaging section has at least an end portion extending generally alongside the outer tube in a direction substantially parallel to the longitudinal axis. A fixed handle member may be secured to the outer tube such that a handle or hand grip of the member extends alongside and generally parallel with the end portion of the hand-engaging portion of the lever. This permits a user to grab and hold the hand grip with their fingers while urging the hand-engaging portion of the lever towards the hand grip with their thumb, simultaneously releasing the pinning button and allowing position adjustment of a part attached to the outer tube. The user can then easily move the outer tube along the length of the inner tube to the desired position, using the handle to support the weight of the attached part, and then release the lever to re-pin the outer tube to the inner tube. This apparatus therefore requires only one hand to maintain safe and complete control of the adjustment apparatus and attached part.

The lever is made of metal flat bar or plate material in one exemplary embodiment, but may be made of other materials such as round or square tubing, molded plastic, or cast metal. The inner and outer tubes may be of square or rectangular tubular construction, with second and third side walls of the outer tube extending perpendicular to the first side wall in which the locator hole is located. The pinning section in the exemplary embodiment has a length greater than the width of the first side wall, and extends across the first side wall outwardly to one side of the first wall. The biasing device may be mounted on a bracket projecting outwardly from the second wall to engage the lever adjacent its first end. In this case, the pivot mount is located between the first end of the lever and the pinning button. In another embodiment, the pinning button is located adjacent the first end of the lever, and the biasing device acts on a portion of the pinning section on the opposite side of the pivot mount, adjacent the hand-engaging portion of the lever.

In one exemplary embodiment of the invention, the handle is generally L-shaped, with a shorter portion secured to the outer tube and the longer portion extending in a direction generally parallel to the longitudinal axes of the tubes and alongside the hand-engaging section of the lever. In one embodiment, the handle is secured to the first side wall beneath the pinning section of the lever arm. In another embodiment, the handle is secured to a second side wall of the outer tube adjacent the biasing device.

As noted above, the lever may be of flat, plate-like construction with the hand engaging section lying in a plane extending at a generally obtuse angle to the plane of at least the majority of the pinning section. The pinning section may extend either to the right or the left of the hand engaging section, and may be actuated by either hand in either orientation. The hand engaging section preferably has an enlarged end portion for engagement by the user's thumb, making the lever more comfortable to use. The size and positioning of the hand engaging section allows the physically challenged to actuate the mechanism using the heel of the hand instead of the thumb.

The apparatus of this invention will be much easier to use than grasping and pulling a straight pin or pull pin, or twisting a knob, as in some prior art arrangements. The user needs only one hand when making an adjustment. No additional assistance is needed (hand or feet) to hold and safely control the part being adjusted. Instead, the part is secured to the outer tube, and the user simply grips the handle with their fingers while depressing the hand engaging section with the thumb, allowing the pinning button to be disengaged while controlling movement of the part being adjusted. The direct engaging, single stage design makes the apparatus cost efficient to produce and maintain. The apparatus may be used for adjustment of either load engaging or non-load engaging parts of an exercise machine.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 1 is a perspective view of a lever for an adjustment apparatus according to a first embodiment of the invention;

FIG. 2 is a perspective view of the adjustment apparatus according to the first embodiment with the components separated;

FIG. 3 is similar to FIG. 2 with the components assembled;

FIG. 4 is a top view of the apparatus of FIG. 3, showing the lever action;

FIG. 5 is a perspective view of an alternative lever configuration;

FIG. 6 is a perspective view of an adjustment apparatus according to a second embodiment of the invention, using the FIG. 5 lever, with the components separated;

FIG. 7 is a top view of the apparatus of FIG. 6, showing the lever action;

DETAILED DESCRIPTION OF THE DRAWINGS

Figures 8, 9:
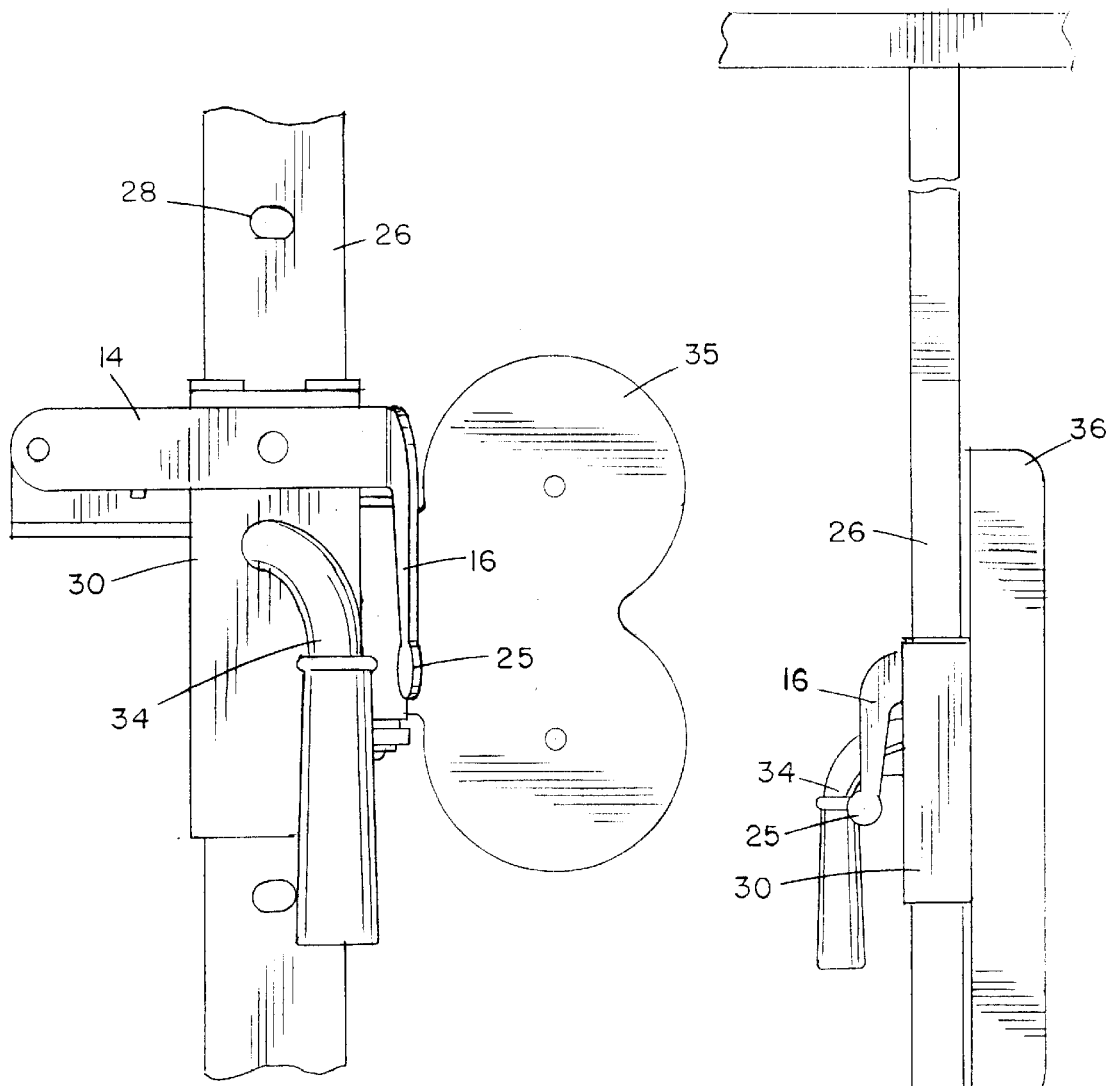
FIG. 8 is a side view illustrating the adjustment apparatus of FIGS. 1 to 4 attached to a load-engaging member of an exercise machine.
FIG. 9 is a side view illustrating a non-load bearing member attached to the adjustment apparatus.

FIG. 1 of the drawings illustrates a lever 10 for use in an adjustment apparatus according to a first exemplary embodiment of the invention, and FIGS. 2 to 4 illustrate the assembly of lever 10 with the other components of the adjustment apparatus 12. As best illustrated in FIGS. 1 and 2, the lever 10 is of elongate, flat plate construction, and has a pinning section 14 which is generally planar and extends from a first end 15 of the lever, and an elongate, planar hand engaging section 16 which projects at an angle to the pinning section 14. As best illustrated in FIG. 4, the hand engaging section 16 is bent about a first bend 17 to extend at an obtuse angle to pinning section 14. The hand engaging section is also bent outwardly about a second bend 18 to extend to one side of the pinning section, as best indicated in FIGS. 1 and 2. This produces an offset hand engaging section which is askew to the lever.

The pinning section 14 of the lever has an inner face having a first, spring-locating button 20 extending from a location adjacent the first end 15, a pivot mounting bracket 22 spaced inwardly from button 20, and a second, pinning button 24 located between bracket 22 and the first bend 17. The bracket 22 is generally U-shaped and has a pair of aligned through holes 51, one in each leg of the bracket. The hand engaging section has an enlarged, rounded end 25 for engagement by a user's thumb, as described in more detail below.

FIG. 2 illustrates the components of the exemplary adjustment apparatus separated, while FIG. 3 illustrates the fully assembled apparatus. The apparatus basically comprises an inner tube 26 having a series of spaced pinning holes 28 along at least part of its length, an outer tube 30 telescopically mounted over the inner tube and having a locator hole or opening 32 for alignment with a selected pinning hole, the lever 10 being pivotally mounted on the outer tube so that the pinning button 24 faces the locator hole, and a handle 34 mounted on the outer tube for use in conjunction with the hand engaging section of the lever.

In most cases, the inner tube will be a fixed part of the exercise machine framework, such as an upright strut of the framework as illustrated in FIG. 9, while a component or part of the machine to be adjusted by the user is secured to the outer tube 30 of the adjustment apparatus. For example, FIG. 8 illustrates a load-bearing member comprising a pulley mount 35 secured to the outer tube 30, while FIG. 9 illustrates a seat back pad 36 or non-load bearing member secured to the outer tube. Clearly, many other components which are position adjustable may be adjusted using this apparatus, such as exercise arms, cable ends, platforms, seat pads, and back pads.

In the illustrated embodiment, the inner and outer tubes are of matching rectangular cross section, although they may be of different cross-sections in alternative embodiments, such as round. The outer tube has a first side wall 38 in which the locator hole 32 is positioned facing the corresponding side wall 39 of the inner tube in which the pinning holes 28 are located.

The outer tube 30 also has opposite end walls 40, 41 which extend perpendicular to the side wall 38, and side wall 42 opposite wall 38. An angled mounting bracket or stand off 44 of generally L shaped cross section extends outwardly from the end wall 40 and has a first, upright leg 45 and a second, perpendicular leg 46. A pivot mounting block 47 and a spring locating button 48 are mounted on the upright leg 45 in alignment with locator hole 32. Pivot mounting block 47 has a through bore 49, and a pivot pin 50 extends through aligned holes 51 in the pivot mounting bracket 22 on the lever and through bore 49, so that the lever 10 is pivotally mounted in alignment with the locator hole 32 and extends transversely across the first side wall 38 of the outer tube. A biasing spring 52 has opposite ends located over the spring locating buttons 20, 48 of the lever and the mounting bracket, respectively. Once assembled, the spring is trapped and cannot pop out. Spring 52 acts to bias the end 15 of the lever away from the mounting bracket and outer tube, in turn biasing the pinning button 24 through the locator hole 32 and an aligned pinning hole 28 in the operative position illustrated in dotted outline in FIG. 4.

The length of the pinning section 14 of the lever 10 is greater than the width of the outer tube side wall 38 such that opposite ends of the section 14 project outwardly beyond the end walls 40 and 41, as best illustrated in FIGS. 3 and 8. The hand engaging section 16 is oriented relative to the pinning section such that when the pinning section is pivotally mounted on side wall 38 to extend transversely across the side wall, the hand engaging section will extend outwardly from the tube and downwardly alongside the tube 30 at an obtuse angle to the side wall 38. In one example, the hand-engaging section 16 when released extends at an angle a of around 165° to the end wall 41, as indicated in FIG. 4.

The handle 34 is generally L-shaped, with the first, shorter portion of the handle projecting transversely outwardly from the side wall 38 and a second, longer portion projecting downwardly as viewed in FIGS. 3 and 8 in a direction generally parallel to the longitudinal axis of the outer and inner tubes, and alongside the hand engaging portion 16 of the lever, which faces the longer portion of the handle, as indicated in FIG. 3. The longer portion of the handle preferably has a rubber or plastic hand grip 54 for gripping by a user's fingers.

Operation of the adjustment apparatus of FIGS. 1 to 4 will now be described, with particular reference to FIG. 4. In the locked position illustrated in dotted outline in FIG. 4, the first or pinning section 14 of the lever is biased by spring 52 flat against the side wall 38 of the outer tube. The pinning button 24 extends through locator hole 32 in the outer tube and an aligned hole 28 in the inner tube. This secures the outer tube 30 and an attached component of the exercise machine in position. If the user wishes to adjust the position of the component, they simple grasp the hand grip 54 with their fingers while depressing the enlarged, thumb-engaging end 25 of the hand engaging section 16 with their thumb, in the direction of the arrow in FIG. 4. This moves the end towards hand grip 54, causing the lever to rotate in a clockwise direction about pivot pin or shaft 50, and lifting the pinning button 24 out of the inner tube pinning hole 28. This frees the outer tube 30 for movement along the inner tube 26. Keeping pressure on the end 25 of the lever, the user then moves the outer tube via the handle 34 to the desired position, and releases the lever to re-pin the outer tube in place. This apparatus therefore requires only one hand to maintain safe and complete control of the movable component during the adjustment process. The hand engaging section of the lever has to move through only a relatively small angle of b° from the operative position illustrated in dotted outline in FIG. 4 to the released position illustrated in solid lines. In the illustrated embodiment, the angle b is only about 11°, and the distance moved by the hand engaging section between these two positions is less than ½".

FIGS. 5 to 7 illustrate an adjustment apparatus 60 according to another exemplary embodiment of the invention. This apparatus has a modified lever 62 and a modified mounting assembly for pivotally mounting the lever on the outer tube 30. Some parts of the apparatus 60 are identical to parts in the previous embodiment, and like reference numerals have been used for like parts as appropriate. The apparatus 60 basically comprises an inner tube 26 having a series of spaced pinning holes 28 along at least part of its length, an outer tube 30 having a locator hole 32 in a front side wall 38 for alignment with a selected pinning hole 28, the lever 62 which is pivotally mounted on the outer tube to extend across the locator hole 32, and a handle 34 which is mounted on the end wall 41 rather than front side wall 38 in this embodiment.

The modified lever 62 will first be described in more detail with reference to FIG. 5. As in the first embodiment, the lever 62 has a first, pinning section 64 and a second, hand engaging section 65. However, unlike the first embodiment where the pinning section 14 was flat and planar, the pinning section 64 has three portions 66, 67 and 68 bent at angles to one another, extending from the first end 69 of the lever to the hand-engaging section 65. The first and third portions 66 and 68 at opposite ends of pinning section 64 are each bent at an angle to the middle portion 67 and extend generally parallel to one another, so that portion 68 is offset outwardly when the lever is assembled on the outer tube. A pinning button 70 extends from the inner face of the first end portion 66, and a spring locating button 72 extends from the second end portion 68 parallel to button 70. A U-shaped pivot bracket 74 extends from the middle portion 67. Aligned holes 75 are provided in the two legs of bracket 74, as in the previous embodiment.

The hand engaging section 65 is bent about a first bend 76 so as to extend at an obtuse angle to the adjacent end portion 68 of the pinning section, as best illustrated in FIG. 7. The hand engaging section 65 is also bent outwardly about bend 78 in the plane of section 65 so as to project to one side of the pinning section, as illustrated in FIGS. 5 and 6. The section 65 tapers inwardly from bend 78 and terminates in an enlarged, round or bulb-shaped thumb-engaging portion 80.

Instead of bracket or stand-off 44 extending from the left hand end wall 40 of the outer tube 30 as in the previous embodiment, the outer tube 30 in this embodiment has a mounting bracket or stand-off 82 extending from the opposite end wall 41 to the right of the front side wall 38, as illustrated in FIGS. 6 and 7. Bracket 82 is also generally L-shaped, with a first leg 83 secured flat against end wall 41, and a longer leg 84 extending outwardly perpendicular to end wall 41 and in alignment with front side wall 38, forming an extension of the side wall, as indicated in FIG. 7. A U-shaped pivot bracket 85 projects outwardly from leg 84 and has aligned holes 86. A spring locating button 88 projects outwardly adjacent the end of leg 84.

The lever 62 is pivotally mounted on pivot bracket 85 via pivot pin 90, with the pivot bracket 74 engaging between the legs of the pivot bracket 85, and pin 90 extending through the aligned holes 86 and 75, as illustrated in FIG. 7. A biasing spring 92 is mounted over locating buttons 72 and 88 on the lever and mounting bracket 82, respectively. The spring 92 biases the end portion 66 of the lever towards the front side wall 38 of the outer tube so that the pinning button 70 extends through the locator hole 32 and an aligned pinning hole 28 in the inner tube, as indicated in dotted outline in FIG. 7, with the portion 66 flat against side wall 38. The hand-engaging section 65 is bent inwardly relative to the pinning section such that it extends across the end of leg 84 at an angle c° to the end wall 41, as indicated in dotted outline in FIG. 7. In the illustrated example, the angle c is around 15°. A comparison of FIGS. 4 and 7 will reveal that, in the first embodiment, the hand-engaging portion 16 is bent outwardly, away from the outer tube 30, about bend 17, whereas in this embodiment, the hand-engaging portion 65 is bent in the opposite direction, towards the tube. Thus, in this embodiment, the handle 34 is mounted on the leg 83 of stand-off 82 on end wall 41, rather than on the front side wall 38. The handle 34 extends across the end of stand-off 82 and then downwardly along end wall 41, and is spaced outwardly from the end wall as indicated in FIGS. 6 and 7. The thumb-engaging end 80 of the lever thus faces the hand grip 54.

Operation of the apparatus of FIGS. 5 to 7 is similar to that of FIGS. 1 to 4. In the operative position illustrated in dotted outline in FIG. 7, the biasing spring 92 biases the end portion 66 of the lever flat against the side wall 38 so that pinning button 70 extends through locator hole 32 and an aligned pinning hole 28 in the inner tube 26, securing the outer tube 30 and an attached component (not illustrated) in a fixed position along the inner tube 26. It will be understood that any adjustable component of an exercise machine may be attached to the outer tube 30 in this embodiment, as in the previous embodiment, in a similar manner to that illustrated in FIGS. 8 and 9. In each case, the component or part may be attached to the opposite side wall 42 of the outer tube to the lever 10 or 62, although other attachment positions are possible.

When a user wishes to re-position the part, they simply grip the hand grip 54 with their fingers and press their thumb against the rounded end portion 80 of the hand-engaging section of the lever, pushing the end portion 80 towards the hand grip 54, in the direction of the arrow in FIG. 7. This pivots the lever in an anti-clockwise direction about pivot shaft 90, moving the pinning button 70 out of the aligned pinning hole 28 and the hand-engaging portion 65 towards the handle 34, as indicated in solid lines in FIG. 7. This releases the outer tube 30 and attached part of the exercise machine for movement along the length of the inner tube. Keeping pressure on the lever, the user moves the outer tube via the handle 34 to the desired position, and then releases the lever. This allows the biasing spring to urge the pinning button back through the locator hole and the newly aligned pinning hole 28, re-pinning the outer tube and attached component in place. The hand engaging portion of the lever has to move through only a relatively small angle d in order to release the pinning button. In the illustrated embodiment, angle d is around 12° and the distance moved by the section 65 is just over ½".

In each of the above embodiments, the lever 10, 62 is of bent, flat plate material. However, it may alternatively be of other materials, such as round or square tubing, molded plastic, or cast metal. The compression spring 52, 92 may be replaced by a tension, extension, or leaf spring. Additionally, the placement of the spring or handle could be changed, and the lever may have a right or left pinning orientation. In the illustrated embodiments, the pinning section is to the left of the hand-engaging section. However, in other embodiments, the lever may have a pinning section to the right of the hand-engaging section, as long as the hand-engaging section is positioned in front of the handle.

In both of the above embodiments, the user needs only one hand when making an adjustment, and can readily grip the handle to support the component to be adjusted as the pinning button is released and the outer tube is moved to a new location. No additional assistance is needed from the other hand or the feet in order to hold and safely control the part being adjusted. Because the apparatus is thumb adjusted and the fingers are free to grip the handle, safety and ease of control for both the adjustment and the locking and unlocking of the pinning device are achieved. Once positioned and released, the outer tube of the adjustment apparatus cannot be moved unless the lever is depressed. The direct engaging, single stage design of this apparatus makes it cost efficient to produce and maintain.

Due to the shape of the lever and its position relative to the handle in both embodiments, it is adaptable for use with either hand and can be used by both physically challenged and able bodied users. Some prior art adjustment devices were difficult for users with hand disabilities, such as arthritis or hand injuries. Such individuals would find it difficult to grasp and pull a straight pin or pull-pin, to twist a knob, to squeeze with the fingers, or to grip and hold using the thumb. With this invention, the physically challenged user can actuate the adjuster by using the heel of their hand to depress the lever, instead of the thumb.

This apparatus places the handle and the hand or thumb-engaging end of the lever in the optimum relative positions for easy and comfortable use. Because the hand-engaging section of the lever is positioned in front of the handle, the fingers are able to grab and hold the handle to control the adjusting movement, leaving the thumb free to actuate the lever. Anatomically, this is the way it should be. The relative positioning of the hand grip and enlarged end of the hand-engaging portion of the lever is such that, when the fingers grasp the hand grip, the thumb will naturally be positioned in front of the portion 25 or 80 of the lever. The fingers are better suited for gripping and holding than the thumb. The thumb, with its articulated movement and greater range of motion, is better suited to press and release a lever or actuator. The thumb will follow a natural movement path when actuating the lever. In the first of the above embodiments, the movement is outward and rearward through only a relatively small angle and short distance of less than half an inch. In the second of the above embodiments, the thumb must also move through only a relatively small angle and a distance of just over half an inch.

The enlarged, hand-engaging surface 25,80 makes the lever easier and more comfortable to use. Also, because of the size and positioning of the hand-engaging end 25, 80, the physically challenged can actuate the mechanism by using the heel of their hand, instead of the thumb. The single stage, direct engagement system provides unrestricted bidirectional adjustment. The apparatus combines ease of adjustment with security and versatility, and is adaptable for all users.

Although some exemplary embodiments of the invention have been described above by way of example only, it will be understood by those skilled in the field that modifications may be made to the disclosed embodiments without departing from the scope of the invention, which is defined by the appended claims.

We claim:

1. An adjustment apparatus for adjusting the position of a member on an exercise machine, comprising:

an inner tube having a series of spaced, in line, pinning holes;

an outer tube telescopically engaged over the inner tube and having a locator hole for alignment with a selected pinning hole;

a lever having first and second ends, a first, pinning section extending from the first end along part of the lever and a second, hand engaging section extending from the pinning section to the second end at an angle to the pinning section;

the pinning section being pivotally mounted on the outer tube to extend across the locator hole, the pinning section having a pinning button projecting towards the locator hole, and being pivotable between an operative position in which the pinning button projects through the locator hole and an aligned pinning hole in the inner tube to secure the tubes together, and a retracted position in which the pinning button is spaced away from the locator hole;

a biasing device on the outer tube biasing the lever towards the operative position;

the hand engaging section projecting at an obtuse angle to the pinning section of the lever and outwardly to one side of the lever, whereby pressing of said hand engaging section in a release direction by a user moves said pinning button from said operative position to said released position; and the inner and outer tubes having a longitudinal axis along which the outer tube is movable in order to adjust the position of a part attached to the outer tube, the pinning section extending across the outer tube in a direction transverse to the longitudinal axis of the telescopically engaged tubes, and the hand engaging section having at least an end portion extending generally alongside the outer tube in a direction substantially parallel to the longitudinal axis.

2. The apparatus as claimed in claim 1, wherein the hand engaging section has an enlarged, bulb-shaped end portion for engagement by a user's thumb.

3. The apparatus as claimed in claim 1, wherein the lever has a first bend at a junction between the pinning section and the hand-engaging section whereby the hand-engaging section extends in a first plane at an obtuse angle to at least part of the pinning section, and the hand-engaging section has a second bend in the first plane for directing the hand-engaging section outwardly to one side of the pinning section.

4. The apparatus as claimed in claim 1, wherein the pinning section is flat.

5. An adjustment apparatus for adjusting the position of a member on an exercise machine, comprising:

an inner tube having a series of spaced, in line, pinning holes;

an outer tube telescopically engaged over the inner tube and having a locator hole for alignment with a selected pinning hole;

a lever having first and second ends, a first, pinning section extending from the first end along part of the lever and a second, hand engaging section extending from the pinning section to the second end at an angle to the pinning section;

the pinning section being pivotally mounted to the outer tube for rotation about a pivot axis, and extending across the locator hole, the pinning section having a pinning button projecting towards the locator hole, and being pivotable between an operative position in which the pinning button projects through the locator hole and an aligned pinning hole in the inner tube to secure the tubes together, and a retracted position in which the pinning button is spaced away from the locator hole;

a biasing device on the outer tube biasing the lever towards the operative position;

the hand engaging section projecting at an obtuse angle to the pinning section of the lever and outwardly to one side of the lever, whereby pressing of said hand engaging section in a release direction by a user moves said pinning button from said operative position to said released position; and a fixed handle member secured to the outer tube and including a hand grip portion extending alongside and generally parallel with the hand-engaging portion of the lever.

6. The apparatus as claimed in claim 5, wherein the lever is made of flat plate material.

7. The apparatus as claimed in claim 5, wherein the inner and outer tubes are of rectangular tubular construction, the outer tube having a first side wall in which the locator hole is located.

8. The apparatus as claimed in claim 7, wherein the handle member is mounted on the first side wall beneath the locator hole and the hand-engaging section of the lever extends alongside the handle and faces the handle, whereby a user can grip the handle with their fingers while engaging the hand-engaging section with the thumb.

9. The apparatus as claimed in claim 7, wherein the outer tube has first and second end walls extending perpendicular to the first side wall, and the handle member is mounted on the first end wall and includes the hand grip portion extending in a direction parallel to the longitudinal axis of the tube, the hand-engaging section of the lever being bent to extend along the first end wall at a location spaced outwardly from and facing the hand grip portion.

10. The apparatus as claimed in claim 5, wherein at least part of the pinning section is located in a first plane and the lever has a first bend between the pinning section and hand-engaging section whereby the hand-engaging section lies in a second plane at an obtuse angle to the first plane.

11. The apparatus as claimed in claim 10, wherein the hand-engaging section has a second bend in the second plane spaced from the first bend, the second bend dividing the hand-engaging section into a first portion extending from the first bend to the second bend, and a second portion extending from the second bend to the second end of the lever, the second portion extending outwardly to one side of the pinning section.

12. The apparatus as claimed in claim 5, wherein the pivot axis and biasing device are positioned in line with the locator hole.

13. An adjustment apparatus for adjusting the position of a member on an exercise machine, comprising:

an inner tube having a series of spaced, in line, pinning holes;

an outer tube telescopically engaged over the inner tube and having a locator hole for alignment with a selected pinning hole;

a lever having first and second ends, a first, pinning section extending from the first end along part of the lever and a second, hand engaging section extending from the pinning section to the second end at an angle to the pinning section;

the pinning section being pivotally mounted on the outer tube to extend across the locator hole, the pinning section having a pinning button projecting towards the locator hole, and being pivotable between an operative position in which the pinning button projects through the locator hold and an aligned pinning hole in the inner tube to secure the tubes together, and a retracted position in which the pinning button is spaced away from the locator hole;

a biasing device on the outer tube biasing the lever towards the operative position;

the hand engaging section projecting at an obtuse angle to the pinning section of the lever and outwardly to one side of the lever, whereby pressing of said hand engaging section in a release direction by a user moves said pinning button from said operative position to said released position; and the outer tube having a bracket extending outwardly from the tube in a direction generally parallel with the pinning section of the lever, and the pinning section is pivotally mounted on the bracket.

14. The apparatus as claimed in claim 13, wherein the biasing device is mounted between the bracket and the pinning section of the lever.

15. An adjustment apparatus for adjusting the position of a member on an exercise machine, comprising:

an inner tube having a series of spaced, in line, pinning holes;

an outer tube telescopically engaged over the inner tube and having a locator hole for alignment with a selected pinning hole;

a lever having first and second ends, a first, pinning section extending from the first end along part of the lever and a second, hand engaging section engaging from the pinning section to the second end at an angle to the pinning section;

the pinning section being held pivotally mounted on the outer tube to extend across the locator hole, and pinning section having a pinning button projecting towards the locator hole, and being pivotable between an operative position in which the pinning button project through the locator hole and an aligned pinning hole in the inner tube to secure the tubes together, and a retracted position in which the pinning button is spaced away from the locator hole;

a biasing device on the outer tube biasing the lever towards the operative position;

the hand engaging section projecting at an obtuse angle to the pinning section of the lever and outwardly to one side of the lever, whereby pressing of said hand engaging section in a release direction by a user moves said pinning button from said operative position to said released position; and the pinning section having three relatively angled portions comprising first and second end portions and an intermediate portion connecting the end portions and extending at an angle to each end portion.

16. The apparatus as claimed in claim 15, wherein the end portions extend parallel to one another, the pinning button projects from the first end portion, the biasing device acts on the second end portion, and the intermediate portion has a pivot bracket for pivotally mounting the lever on the outer tube.

17. An adjustment apparatus for adjusting the position of a member on an exercise machine, comprising:

an inner tube having a series of spaced, in line, pinning holes;

an outer tube telescopically engaged over the inner tube and having a locator hole for alignment with a selected pinning hole;

a lever having first and second ends, a first, pinning section extending from the first end along part of the lever and a second, hand engaging section extending from the pinning section to the second end at an angled to the pinning section;

the pinning section being pivotally mounted on the outer tube for rotation about a pivot axis and extending across the locator hole, the pinning section having a pinning button projecting towards the locator hole, and being pivotable between an operative position in which the pinning button projects through the locator hole and an aligned pinning hole in the inner tube to secure the tubes together, and a retracted position in which the pinning button is spaced away from the locator hole;

a biasing device on the outer tube biasing the lever towards the operative position;

the hand engaging section projecting at an obtuse angle to the pinning section of the lever and outwardly to one side of the lever, whereby pressing of said hand engaging section in a release direction by a user moves said pinning button from said operative position to said released position; and the biasing device engaging the first end of the lever and the pinning button being located between the pivot axis and the hand-engaging section.

18. An adjustment apparatus for adjusting the position of a member on an exercise machine, comprising:

an inner tube having a series of spaced, in line, pinning holes;

an outer tube telescopically engaged over the inner tube and having a locator hole for alignment with a selected pinning hole;

a lever having first and second ends, a first, pinning section extending from the first end along part of the lever and a second, hand engaging section extending from the pinning section to the second end at an angle to the pinning section;

the pinning section being pivotally mounted on the outer tube for rotation about a pivot axis, and extending across the locator hole, the pinning section having a pinning button projecting towards the locator hole, and being pivotable between an operative position in which the pinning button projects through the locator hole and an aligned pinning hole in the inner tube to secure the tubes together, and a retracted position in which the pinning button is spaced away from the locator hole;

a biasing device on the outer tube biasing the lever towards the operative position;

the hand engaging section projecting at an obtuse angle to the pinning section of the lever and outwardly to one side of the lever, whereby pressing of said hand engaging section in a release direction by a user moves said pinning button from said operative position to said released position; and the pinning button being located at the first end of the lever and the biasing device engaging the pinning section at a location between the pivot axis and hand-engaging section of the lever.

19. A lever for releasably securing two telescoping tubes together in any one of a plurality of selected relative positions, comprising:

an elongate member having opposite first and second ends, the member comprising a first, pinning section extending from the first end and a second, hand-engaging section extending from the pinning section to the second end of the member;

the pinning section having at least a portion adjacent to the hand-engaging section which lies in a first plane, and the hand-engaging section being bent about a first bend relative to the first plane to extend at an obtuse angle to the first plane, the first bend comprising a junction between the pinning section and hand-engaging section;

the hand-engaging section being bent about a second bend relative to the first bend such that a substantial portion of the hand-engaging section extends laterally relative to the pinning section;

the pinning section having opposite ends at the first end of the lever and adjacent the junction, respectively;

a pinning button extending from a location adjacent one end of the pinning section for extending through a locator hole in an outer tube and an aligned pinning hole in an inner tube in an operative position of the lever;

a pivot bracket extending from the pinning section at a location spaced from the pinning button for pivotally mounting the lever on the outer tube; and the pinning section being flat and lying entirely in said first plane.

20. A lever for releasably securing two telescoping tubes together in any one of a plurality of selected relative positions, comprising:

an elongate member having opposite first and second ends, the member comprising a first, pinning section extending from the first end and a second, hand-engaging section extending from the pinning section to the second end of the member;

the pinning section having at least a portion adjacent the hand-engaging section which lies in a first plane, and the hand-engaging section being bent about a first bend relative to the first plane to extend at an obtuse angle to the first plane, the first bend comprising a junction between the pinning section and hand-engaging section;

the pinning section having opposite ends at the first end of the lever and adjacent the junction, respectively;

a pinning button extending from a location adjacent one end of the pinning section for extending through a locator hole in an outer tube and an aligned pinning hole in an inner tube in an operative position of the lever;

a pivot bracket extending from the pinning section at a location spaced from the pinning button for pivotally mounting the lever on the outer tube; and the pinning section having opposite first and second flat end portions and a flat connecting portion extending between the end portions, the opposite end portions each being bent at a predetermined angle to the connecting portion, the pinning button projecting transversely from one of the end portions, and the pivot bracket projecting from the connecting portion.

21. An adjustment apparatus for adjusting the position of a member on an exercise machine, comprising:

an inner tube having a series of spaced, in line, pinning holes;

an outer tube telescopically engaged over the inner tube and having a locator hole for alignment with a selected pinning hole;

a lever having first and second ends, a first, pinning section extending from the first end along part of the lever and a second, hand engaging section extending from the pinning section to the second end at an angle to the pinning section;

the pinning section being pivotally mounted on the outer tube to extend across the locator hole, the pinning section having a pinning button projecting towards the locator hole, and being pivotable between an operative position in which the pinning button projects through the locator hole and an aligned pinning hole in the inner tube to secure the tubes together, and a retracted position in which the pinning button is spaced away from the locator hole;

a biasing device on the outer tube biasing the lever towards the operative position;

a handle mounted on the outer tube to extend in the same general direction as the hand-engaging section of the lever, alongside and spaced from the hand-engaging section, such that a user gripping the handle with their fingers can engage the hand-engaging section with their thumb, whereby urging the hand-engaging section towards the handle will pivot the pinning section into the retracted position, and the user can continue to grip the handle and hand-engaging section as the outer tube and an attached adjustable part are moved along the inner tube to a new selected position; and the hand-engaging section extending at an obtuse angle to the pinning section of the lever and being bent to extend generally transversely to one side of the pinning section.

22. The apparatus as claimed in claim 21, wherein the inner and outer tubes have a longitudinal axis along which the outer tube is movable in order to adjust the position of the part attached to the outer tube, the pinning section extends across the outer tube in a direction transverse to the longitudinal axis of the telescopically engaged tubes, and the handle and hand engaging section each extend generally alongside the outer tube in a direction substantially parallel to the longitudinal axis.

23. The apparatus as claimed in claim 21, wherein the lever is made of flat plate material.

24. An adjustment apparatus for adjusting the position of a member on an exercise machine, comprising:

an inner tube having a series of spaced, in line, pinning holes:

an outer tube telescopically engaged over the inner tube and having a locator hole for alignment with a selected pinning hole;

a lever having first and second ends, a first, pinning section extending from the first end along part of the lever and a second, hand engaging section extending from the pinning section to the second end at an angle to the pinning section;

the pinning section being pivotally mounted on the outer tube to extend across the locator hole, the pinning section having a pinning button projecting towards the locator hole, and being pivotable between an operative position in which the pinning button projects through the locator hole and an aligned pinning hole in the inner tube to secure the tubes together, and a retracted position in which the pinning button is spaced away from the locator hole;

a biasing device on the outer tube biasing the lever towards the operative position;

a handle mounted on the outer tube to extend in the same general direction as the hand-engaging section of the lever, alongside and spaced from the hand-engaging section, such that a user gripping the handle with their fingers can engage the hand-engaging section with their thumb, whereby urging the hand-engaging section towards the handle will pivot the pinning section into the retracted position, and the user can continue to grip the handle and hand-engaging section as the outer tube and an attached adjustable part are moved along the inner tube to a new selected position;

the hand-engaging section having an enlarged, thumb-engagement portion at the second end of the lever, the thumb-engagement portion facing the handle; and the handle protruding beyond the thumb-engagement portion such that when a user grips the handle with their fingers, their thumb will be positioned adjacent the thumb-engagement portion.

* * * * *